(12) United States Patent
Suenaga et al.

(10) Patent No.: US 7,886,085 B2
(45) Date of Patent: Feb. 8, 2011

(54) REMOVABLE MEMORY DEVICE, PHASE SYNCHRONIZING METHOD, PHASE SYNCHRONIZING PROGRAM, MEDIUM RECORDING THE SAME, AND HOST TERMINAL

(75) Inventors: Hiroshi Suenaga, Osaka (JP); Osamu Shibata, Hyogo (JP); Noriaki Takeda, Hyogo (JP); Toru Iwata, Osaka (JP); Takaharu Yoshida, Osaka (JP); Yoshiyuki Saito, Osaka (JP)

(73) Assignee: Panasonic Corporation, Osaka (JP)

( * ) Notice: Subject to any disclaimer, the term of this patent is extended or adjusted under 35 U.S.C. 154(b) by 198 days.

(21) Appl. No.: 12/295,051

(22) PCT Filed: Feb. 20, 2007

(86) PCT No.: PCT/JP2007/053008
§ 371 (c)(1),
(2), (4) Date: Sep. 29, 2008

(87) PCT Pub. No.: WO2007/113945
PCT Pub. Date: Oct. 11, 2007

(65) Prior Publication Data
US 2009/0106460 A1 Apr. 23, 2009

(30) Foreign Application Priority Data
Apr. 5, 2006 (JP) .............................. 2006-104039

(51) Int. Cl.
G06F 13/00 (2006.01)
G06F 3/00 (2006.01)
(52) U.S. Cl. ............................... 710/25; 710/8; 710/15; 710/29
(58) Field of Classification Search .................. None
See application file for complete search history.

(56) References Cited

U.S. PATENT DOCUMENTS

| 2002/0037017 A1* | 3/2002 | Kiesel et al. ................. 370/503 |
| 2002/0118476 A1* | 8/2002 | Malone, Sr. ................... 360/48 |
| 2003/0079096 A1 | 4/2003 | Murakami |
| 2003/0090953 A1* | 5/2003 | Kawai et al. ................. 365/233 |
| 2005/0111572 A1 | 5/2005 | Kuroda et al. |

FOREIGN PATENT DOCUMENTS

| JP | 2000-115151 | 4/2000 |
| JP | 2000-196571 | 7/2000 |
| JP | 2001-197046 | 7/2001 |
| JP | 2003-132305 | 5/2003 |
| JP | 2005-124037 | 5/2005 |

OTHER PUBLICATIONS

Clock and Data Synchronization, Logic Devices Inc. [www.logicdevices.com, Online], Jan. 31, 2001 [accessed online on Nov. 11, 2010], URL: http://www.logicdevices.com/support/appnotes/datasync.pdf.*
International Search Report issued May 22, 2007 in the International (PCT) Application No. PCT/JP2007/053008.

* cited by examiner

*Primary Examiner*—Tariq R. Hafiz
*Assistant Examiner*—Scott Sun
(74) *Attorney, Agent, or Firm*—Wenderoth, Lind & Ponack, L.L.P.

(57) ABSTRACT

An object of the present invention is to provide a technique to improve the data transmission efficiency which allows correct reception of the data at the same time. A removable memory device that transmits/receives data to and from a host terminal, which includes: a clock reception section that receives a transmission/reception clock, which is used for transmitting/receiving data between the host terminal and the removable memory device, from the host terminal; a phase synchronization pattern generation section that generates a phase synchronization pattern, which is for adjusting a phase of internal reception clock which the host terminal incorporates for receiving data from the removable memory device, based on the transmission/reception clock; and a transmission section that transmits the generated phase synchronization pattern to the host terminal, and in which the phase synchronization pattern includes a first level signal which lasts for at least two cycles, and a second level signal which follows the first level signal and lasts for one cycle, is provided.

12 Claims, 7 Drawing Sheets

REMOVABLE MEMORY DEVICE, PHASE SYNCHRONIZING METHOD, PHASE SYNCHRONIZING PROGRAM, MEDIUM RECORDING THE SAME, AND HOST TERMINAL

TECHNICAL FIELD

The present invention relates to a removable memory device, a phase synchronizing method, a phase synchronizing program, and a medium recording the same and a host terminal.

BACKGROUND ART

Removable memory devices such as secure digital (SD) memory cards are widely used as recording media for portable music players, cameras, cellular phones and the like because they have large capacity and they are small and can be carried conveniently. Such a removable memory device is connected to a host terminal, and data of video, audio and the like is transmitted to and from the host terminal. When data is transmitted from the removable memory device to the host terminal, the host terminal first transmits transmission/reception clock for transmitting and receiving data to the removable memory device, and then, the removable memory device transmits data based on the transmission/reception clock. Herein, there are two transmission paths: a path from the host terminal to the removable memory device, and a path from the removable memory device to the host terminal. Therefore, a phase shift is generated between internal reception clock for the host terminal to receive data from the removable memory device and the data transmitted from the removable memory device based on the transmission/reception clock and received by the host terminal due to delay caused by passing the two paths. For example, when there is a distance of about 10 cm via a printed circuit board between the host terminal and the removable memory device, delay of about 1.2 ns is generated by passing two paths. Conventionally, a frequency of the transmission/reception clock and the internal reception clock is about 50 MHz, and a cycle of the clock is about 20 ns. Thus, a phase shift due to delay of about 1.2 ns does not prohibit the host terminal from receiving data.

As a method for adjusting a phase shift of clock between a reception terminal which receives data and a transmission terminal which transmits the data when they are operating in different clocks, a method as follows has been used conventionally. When the transmission terminal transmits packetized data to the reception terminal based on its clock, synchronization pattern is attached to each packet before transmitting. If the reception terminal and the transmission terminal are connected via Ethernet®, pattern of "0101 ... " of 64 bits which is same as the clock is used as the synchronization pattern. The reception terminal synchronizes the frequency and the phase of its clock to the clock of the transmission terminal based on the synchronization pattern attached to each packet. In this way, the reception terminal can effectively receive data transmitted from the transmission terminal.

SUMMARY OF THE INVENTION

In recent years, capacity of the removable memory device has been increasing and it becomes indispensable to rapidly transmit/receive data to/from a host terminal. If a clock of a high frequency, for example, about 200 MHz is used as transmission/reception clock and internal reception clock, a cycle of the clock is about 5 ns. A delay of about 1.2 ns caused by passing two paths causes a phase shift which cannot be ignored with respect to a time period of a cycle of the internal reception clock for receiving the data. Thus, sometimes, the host terminal cannot receive data from the removable memory device. Such a problem becomes more significant as the frequency of the clock increases. To solve such a problem, the synchronization pattern of 64 bits as described above may be transmitted to the host terminal for adjusting the phase. However, since the synchronization pattern is 64 bits and is long, data transmission efficiency decreases.

An object of the present invention is to provide a technique to improve the data transmission efficiency which allows correct reception of the data at the same time.

In order to solve the above-described problems, the first invention of the present application provides a removable memory device that transmits/receives data to and from a host terminal, which includes: a clock reception section of receiving transmission/reception clock, which is used for transmitting/receiving data between the host terminal and the removable memory device, from the host terminal; a generation section of generating a phase synchronization pattern, which is for adjusting a phase of internal reception clock which the host terminal incorporates for receiving data from the removable memory device, based on the transmission/reception clock; and a transmission section of transmitting the generated phase synchronization pattern to the host terminal. The phase synchronization pattern includes a first level signal which lasts for at least two cycles, and a second level signal which follows the first level signal and lasts for one cycle.

The clock reception section is supplied with the transmission/reception clock by the host terminal, and the generation section generates the phase synchronization pattern based on the transmission/reception clock. When the transmission section transmits the phase synchronization pattern to the host terminal, the host terminal adjusts the phase of the internal reception clock based on the received phase synchronization pattern. In this way, the phase of the internal reception clock is adjusted to the phase which allows appropriate reception of data from the removable memory device. Thus, when the removable memory device transmits the response and the read data to the command to the host terminal based on the transmission/reception clock, the host terminal can receive the response and the read data correctly without a missing portion.

The phase synchronization pattern has two consecutive bits of a first level signal, followed by one bit of a second level signal, and is formed of a relatively short pattern. For example, the phase synchronization pattern is formed of three bits, "001" or "110". The phase synchronization pattern is attached to packetized response and/or read data and the like in the removable memory, and is transmitted. Since the phase synchronization pattern is short, its proportion in the packet is small. Thus, transmission efficiency of the response and/or read data can be improved.

Herein, the phase synchronization pattern may vary between a limit value of the first level which corresponds to the first level signal and a limit value of the second level which corresponds to the second level signal. In phase synchronization pattern mentioned above, the first level signal lasts for two cycles before one cycle of the second level signal. Thus, the signal value of the first level signal approaches to the limit value of the first level, and then changes so as to become closer to the second level. Therefore, the phase synchronization pattern becomes a clock which entirely locates close to the first level. The host terminal obtains a signal value of the phase synchronization pattern at the edge where it moves from the first level to the second level, and compares the obtained signal value of the phase synchronization pattern and the signal value of the phase synchronization pattern which would have been obtained if there is no phase shift. If there is a phase shift as a result of comparison, it is adjusted. As described above, since the phase synchronization pattern approaches the first level, and also, a change in the signal value is significant at the edge of the movement from the first level to the second level, even a slight phase shift can be detected sensitively and precisely.

The delay time of the transmission path between the removable memory device and the host terminal varies depending upon the distance of the transmission path, and also varies momentarily depending upon reasons other than the distance of the transmission path such as temperature change. However, even if a phase shift is generated due to such a delay, the phase of the internal reception clock is adjusted to the phase which allows appropriate reception of data from the removable memory device for every response to the read command, for example. Further, with the phase synchronization pattern of the present invention, as described above, a phase shift can be detected sensitively and precisely and the phase shift can be adjusted. As described above, by sensitively and precisely detecting a phase shift for every response to the read command, for example, and correcting the phase shift, the ratio of the delay with respect to the internal reception clock can be suppressed even when the internal reception clock becomes a signal of high frequency. Therefore, the host terminal is not influenced by the change in the delay time or the like, and the response, the read data and the like transmitted from the removable memory device can be received correctly without a missing portion even the internal reception clock becomes a signal of high frequency.

The second invention of the present application provides a removable memory device of the present invention, in which the phase synchronization pattern further includes a first level signal which lasts for at least one cycle after the second level signal which lasts for one cycle.

For example, the phase synchronization pattern is formed of four bits such as "0010" and "1101". In the phase synchronization pattern mentioned above, the first level signal lasts for two cycles before the second level signal of one cycle so that the signal value of the first level signal changes such that it first approaches the first level limit value and then moves to the second level. Then, the second level signal lasts for only one cycle, and then it changes into the first level signal. Accordingly, the maximum absolute value of amplitude of the phase synchronization pattern becomes small, and a time period during which the absolute value of the signal value of the second level signal exceeds the threshold of the second level becomes short. This means that the entire phase synchronization pattern is shifted toward the first level, and a time period during which the phase synchronization pattern indicates the second level becomes short. The threshold of the second level is a reference value for determining whether the signal value is at the second level or not, and when the absolute value of the signal value exceeds the threshold, the signal value is determined to be at the second level. When there is a phase shift between the internal reception clock of the host terminal and the data from the removable memory device, the host terminal cannot recognize the second level signal as the second level signal since the time period of the second level of the phase synchronization pattern is short. By decreasing the time period of the second level and narrowing the allowance of the phase shift by using the phase synchronization pattern of the present invention, the host terminal can sensitively and precisely detect a phase shift even when the phase shift is small.

In the above description, the phase shift is detected based on the signal value of the phase synchronization pattern near the maximum value of the amplitude. However, the phase shift can be detected based on the signal value of the phase synchronization pattern at the edge where the signal level moves from the first level to the second level. As described above, since the phase synchronization pattern approaches the first level, and change in the signal value is significant at the edge where the signal level moves from the first level to the second level, even a slight phase shift can be detected sensitively and precisely.

The third invention of the present application provides a removable memory device according to the first invention, which further includes: a start command reception section of receiving a start command, which is for the host terminal to receive read data from the removable memory device from the host terminal; and a packet generation section of sequentially packetizing response to the start command and/or the read data and attaching the phase synchronization pattern to at least a first packet in response to the start command; in which: the transmission section transmits packets including the packet to which the phase synchronization pattern is attached.

The phase synchronization pattern is attached to only at least the first packet which responds to the command, i.e., only the response packet. The host terminal which receives the response packet performs phase adjustment before it receives the read data. Thus, the host terminal can correctly receive the read data included in the packets following the response packet. Since the phase synchronization pattern is a short pattern, transmission efficiency from the removable memory device to the host terminal can be improved. If the phase synchronization pattern is attached to only the first packet, transmission efficiency of the read data can be further improved.

The fourth invention of the present application provides a removable memory device according to the third invention, in which the packet generation section attaches the phase synchronization pattern to all the packets generated in response to the start command.

By attaching the phase synchronization pattern to all the packets, the host terminal can always perform phase adjustment to synchronize the phase, and the response and the read data can be received further correctly. Since the phase synchronization pattern according to the present invention is a pattern made from short bits as described above, transmission efficiency can be improved at the same time.

The fifth invention of the present application provides a removable memory device according to the third invention, in which the transmission section intermittently transmits packets to which the phase synchronization pattern is attached.

By attaching the phase synchronization pattern to the read data packet intermittently, burden of transmission due to transmitting the phase synchronization pattern from the removable memory device to the host terminal can be further reduced. With the phase being synchronized, transmission efficiency of the response and the read data from the removable memory device to the host terminal can be improved.

The sixth invention of the present application provides a removable memory device according to the third invention, in which the phase synchronization pattern includes a head position or end position of the response and/or the read data included in the packet.

In such a case, the phase synchronization pattern also serves as a start signal, the number of bits required for the start signal and the phase synchronization pattern can be decreased, and the number of bits other than the response and the read data in the packets can be decreased. Accordingly, the transmission efficiency of the response and read data from the removable memory device to the host terminal can be further improved.

The seventh invention of the present application provides a removable memory device according to the third invention, in which the transmission section transmits the response included in the packet to which the phase synchronization pattern is attached with divided-by-n frequency clock which is obtained by dividing the transmission/reception clock by n (n>1).

By transmitting the response with the divided-by-n frequency clock, the host terminal can securely receive the response in the packet, and also, can adjust the phase while receiving the response.

The eighth invention of the present application provides a removable memory device according to the first invention, in which the removable memory device is a secure digital (SD) memory card.

The SD memory card is supplied with the transmission/reception clock by the host terminal, and transmits the response and the read data to the host terminal based on the transmission/reception clock. Thus, frequency adjustment does not have to be performed as it does with devices having different frequencies, and the synchronization pattern to be transmitted has to be the phase synchronization pattern for adjusting only the phase. Therefore, the phase synchronization pattern to be transmitted from the SD memory card to the host terminal can be formed relatively short.

To the SD memory card, nonvolatile memory such as flash memory which is readable and writable and the like is incorporated. Other memories which can be incorporated to the removable memory device are, for example, magneto-resistive random access memory (MRAM), ferroelectric random access memory (FeRAM), and the like.

The ninth invention of the present application provides a phase synchronizing method implemented by a removable memory device that transmits/receives data to and from a host terminal, including: a clock reception step of receiving transmission/reception clock, which is used for transmitting/receiving data between the host terminal and the removable memory device, from the host terminal; a generation step of generating a phase synchronization pattern, which is for adjusting a phase of internal reception clock which the host terminal incorporates for receiving data from the removable memory device, based on the transmission/reception clock; and a transmission step of transmitting the generated phase synchronization pattern to the host terminal, in which: the phase synchronization pattern includes a first level signal which lasts for at least two cycles, and a second level signal which follows the first level signal and lasts for one cycle.

The tenth invention of the present application provides a phase synchronizing program implemented by a removable memory device that transmits/receives data to and from a host terminal, which makes the removable memory device function as: a clock reception section of receiving transmission/reception clock, which is used for transmitting/receiving data between the host terminal and the removable memory device, from the host terminal; a generation section of generating a phase synchronization pattern, which is for adjusting a phase of internal reception clock which the host terminal incorporates for receiving data from the removable memory device, based on the transmission/reception clock; and a transmission section of transmitting the generated phase synchronization pattern to the host terminal, in which: the phase synchronization pattern includes a first level signal which lasts for at least two cycles, and a second level signal which follows the first level signal and lasts for one cycle.

The eleventh invention of the present application provides a computer readable recording medium on which a phase synchronizing program implemented by a removable memory device that transmits/receives data to and from a host terminal is recorded, the computer readable recording medium records the phase synchronizing program which implements: a clock reception step of receiving transmission/reception clock, which is used for transmitting/receiving data between the host terminal and the removable memory device, from the host terminal; a generation step of generating a phase synchronization pattern, which is for adjusting a phase of internal reception clock which the host terminal incorporates for receiving data from the removable memory device, based on the transmission/reception clock; and a transmission step of transmitting the generated phase synchronization pattern to the host terminal, in which: the phase synchronization pattern includes a first level signal which lasts for at least two cycles, and a second level signal which follows the first level signal and lasts for one cycle.

The twelfth invention of the present application provides a host terminal that transmits/receives data to and from a removable memory device, including: a clock transmission section of transmitting transmission/reception clock, which is used for transmitting/receiving data between the host terminal and the removable memory device, to the removable memory device; a phase synchronization pattern reception section of receiving a phase synchronization pattern, which is generated based on the transmission/reception clock and which is for adjusting a phase of internal reception clock which the host terminal incorporates for receiving data from the removable memory device, from the removable memory device; and a phase shift detection section of detecting a phase shift between the internal reception clock and the data transmitted based on the transmission/reception clock from the removable memory device based on the phase synchronization pattern, in which: the phase synchronization pattern includes a first level signal which lasts for at least two cycles, and a second level signal which follows the first level signal and lasts for one cycle; the phase synchronization pattern reception section receives a plurality of phase synchronization patterns; and the phase shift detection section detects a phase shift by averaging a plurality of phase shifts detected based on the plurality of phase synchronization patterns.

The host terminal may detect a phase shift due to an influence of noise. For example, even when there is no phase shift, the host terminal may judge noise as the phase shift and adjust the phase of the internal reception clock. As a result, the data cannot be received. Therefore, the host terminal detects the phase shift for several times and gains average to reduce the influence due to noise for adjusting the phase. In this way, the host terminal can correctly obtain the data.

According to the present invention, a technique to improve the data transmission efficiency which allows correct reception of the data at the same time is provided.

EXPLANATION OF REFERENCE

Figure 1A:
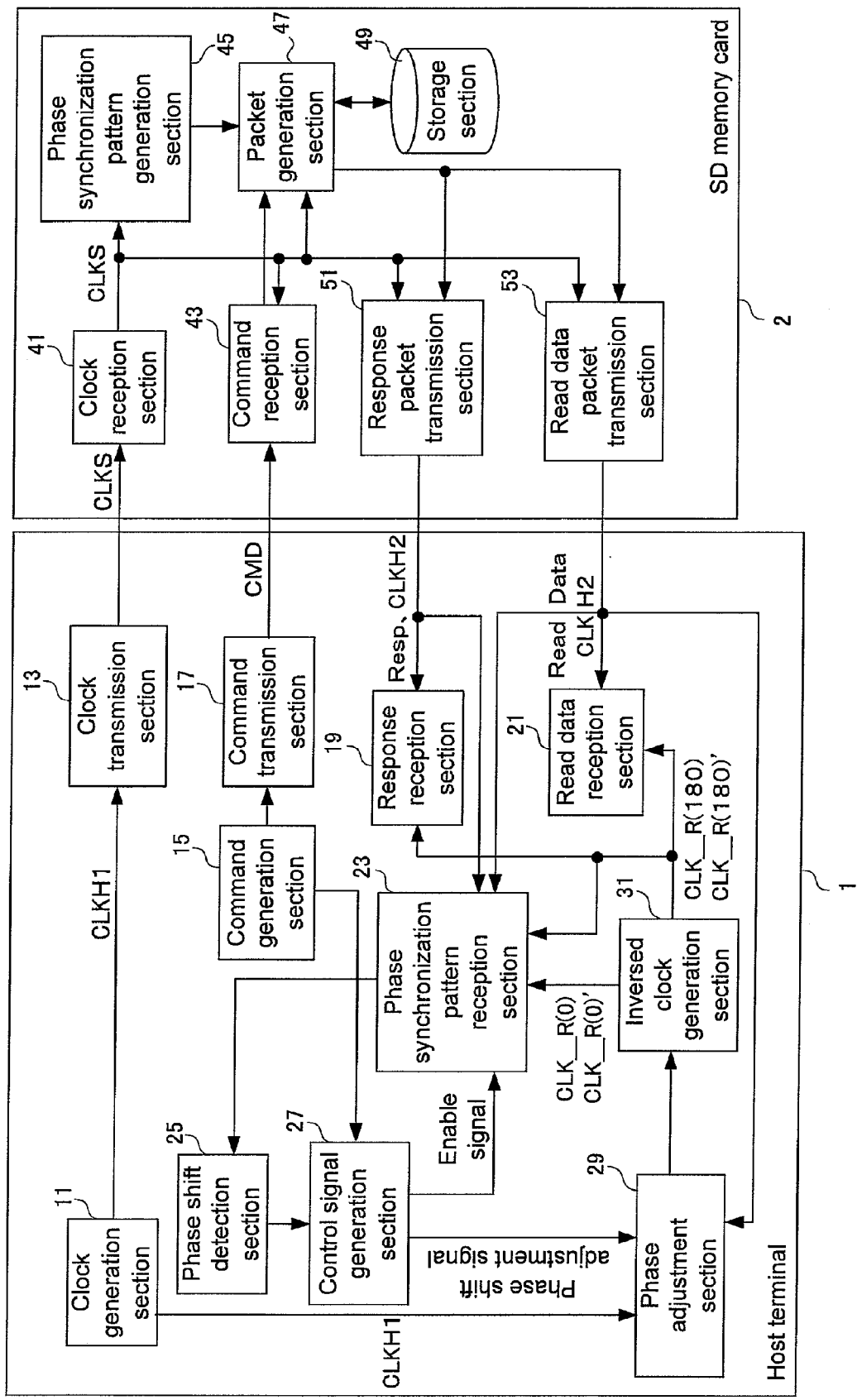
FIG. 1A is a block diagram showing a system structure of a host terminal and secure digital (SD) memory according to one embodiment.

1 Host terminal
2 SD memory card
11 Clock generation section
13 Clock transmission section
15 Command generation section
17 Command transmission section
19 Response reception section
21 Read data reception section
23 Phase synchronization pattern reception section
25 Phase shift detection section
27 Control signal generation section
29 Phase adjustment section
31 Inversed clock generation section
41 Clock reception section
43 Command reception section
45 Phase synchronization pattern generation section
47 Packet generation section
49 Storage section
51 Response packet transmission section
53 Read data packet transmission section

DETAILED DESCRIPTION OF THE INVENTION

A removable memory device according to the present invention includes: a clock reception section for receiving a transmission/reception clock, which is used for transmitting/receiving data between the host terminal and the removable memory device, from the host terminal; a generation section for generating a phase synchronization pattern, which is for adjusting phases of the clock transmitted by host terminal and an internal reception clock which the host terminal incorporates for receiving data from the removable memory device, based on the transmission/reception clock; and a transmission section for transmitting the generated phase synchronization pattern to the host terminal. Herein, the phase synchronization pattern includes a first level signal which lasts for at least two cycles, and a second level signal which follows the first level signal and lasts for one cycle.

In this way, the phase of the internal reception clock is adjusted to the phase which allows appropriate reception of data from the removable memory device. Thus, when the removable memory device transmits the response and the read data to the host terminal based on the transmission/reception clock, the host terminal can receive the response and the read data correctly without a missing portion.

Even a phase shift is generated due to a delay, the phase of the internal reception clock is adjusted to the phase which allows appropriate reception of data from the removable memory device for every response to the read command, for example. The ratio of the delay with respect to the internal reception clock can be suppressed even when the internal reception clock becomes a signal of high frequency. Therefore, the host terminal is not influenced by the change in the delay time or the like, and the response, the read data and the like transmitted from the removable memory device can be received correctly without a missing portion even the internal reception clock becomes a signal of high frequency.

The phase synchronization pattern is formed of two cycles of a first level signal and one cycle of a second level signal, and is formed of a relatively short pattern. Thus, transmission efficiency of the response, read data and the like which are transmitted with the phase synchronization pattern can be improved.

As described in the embodiments below, adjusting the phase of the internal reception clock which the host terminal incorporates for receiving the data from the removable memory device means adjusting the clock for the host terminal to obtain the data from the SD memory card so as to have a phase which allows appropriate reception of the data from the SD memory card by the host terminal.

Embodiments (1) Structure

FIG. 1A is a functional block diagram showing a system structure of a host terminal 1 and a secure digital (SD) memory card according to an embodiment. Hereinafter, functions and structures of the host terminal 1 and an SD memory card 2 will be described.

(1-1) Host Terminal

First, functions and a structure of the host terminal 1 will be described.

(a) Clock Generation Section, Clock Transmission Section

A clock generation section 11 generates a basic clock CLKH1 for transmitting/receiving data between the host terminal 1 and the SD memory card 2. The clock generation section 11 outputs the generated CLKH1 to a clock transmission section 13 and a phase shift adjustment section 29. The clock transmission section 13 transmits the clock CLKH1 to the SD memory card 2.

(b) Command Generation Section, Command Transmission Section

A command generation section 15 generates various commands such as a read command for reading out read data such as video, audio, and the like stored in the SD memory card 2, a stop command for suspending reading out of read data from the SD memory card, a phase shift adjustment command for starting mode for adjusting a phase shift, and the like. The command generation section 15 outputs various commands to a control signal generation section 27.

A command transmission section 17 transmits various generated commands to the SD memory card 2.

(c) Phase Shift Adjustment Section, Inversed Clock Generation Section

The phase shift adjustment section 29 generates clock CLK_R(0) from the clock CLKH1 for adjusting a phase shift caused due to transmission delay by a distance of the transmission paths between the host terminal 1 and the SD memory card 2 as a first phase shift adjusting step. An inversed clock generation section 31 generates CLK_R(180) which is in anti-phase of the clock CLK_R(0). Herein, the clock CLK_R(0) is clock for obtaining a phase synchronization pattern which will be described later. The clock CLK_R (180) is a clock for the host terminal 1 to obtain response and read data from the SD memory card 2. The clock CLK_R (180) may also be clock for obtaining the phase synchronization pattern.

Figure 2:
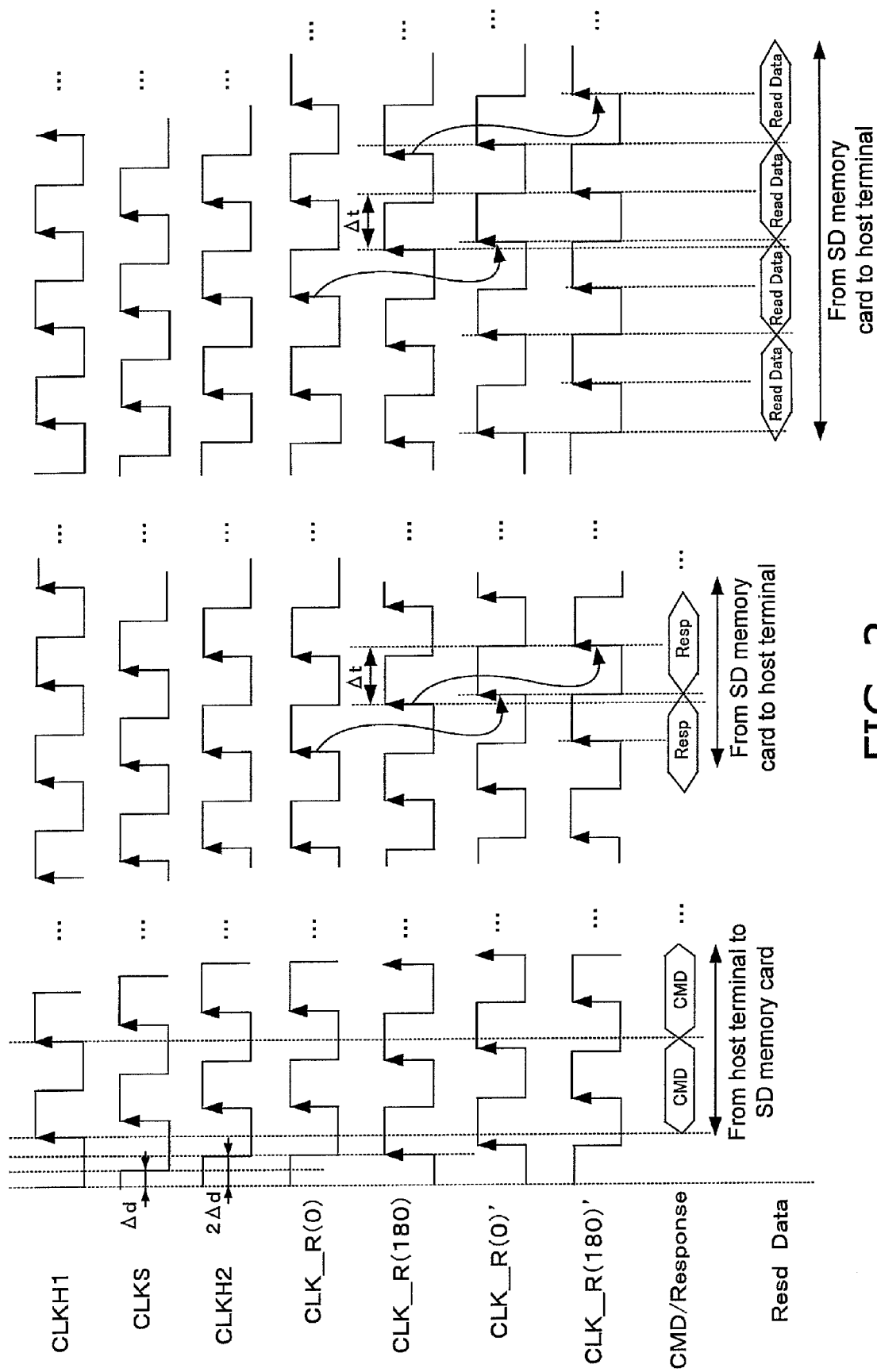
FIG. 2 is an illustrative diagram showing relationship of clock in the host terminal and clock in the SD memory card.

With reference to FIGS. 1A and 2, the first phase adjustment step will be described. FIG. 2 is a diagram illustrating relationship between clock in the host terminal 1 and clock in the SD memory card 2. The clock transmission section 13 of the host terminal 1 transmits the clock CLKH1 to the SD memory card 2. Upon this, due to the path from the host terminal 1 to the SD memory card 2, transmission delay is generated, and the clock CLKH1 reaches the SD memory card 2 as clock CLKS. In other words, assumed that the transmission delay caused by a distance of the transmission path from the host terminal 1 to the SD memory card 2 is $\Delta d$, the phase of the clock CLKS is shifted from the phase of the clock CLKH1 by $\Delta d$. Next, the SD memory card 2 transmits response packets, read data packets or the like, which will be later described, to the host terminal 1 triggered by the clock CLKS. Upon this, the response packets, read data or the like which is output being triggered by the clock CLKS reaches the host terminal 1 with delay caused by the transmission path from the SD memory card 2 to the host terminal 1. If the signal pattern of the response packet of the read data which reaches the host terminal 1 were to be represented by the clock pattern temporarily, it is represented as CLKH2. In other words, due to the distance of the transmission path from the SD memory card 2 to the host terminal 1, transmission delay of $\Delta d$ is generated similarly as described above. Thus, the phase of the clock CLKH2 is shifted from the phase of the clock CLKS by $\Delta d$. As a result, a phase shift of $2\Delta d$ due to transmission delay is generated between the clock CLKH1 transmitted by the host terminal 1 and the response and the read data received by the host terminal 1 from the SD memory card 2. At the first phase adjustment step, the phase shift of $2\Delta d$ generated due to the distance of the transmission path between the host terminal 1 and the SD memory card 2.

Specifically, the phase shift adjustment section 29 receives the read data from the SD memory card 2 when communication starts. As described above, the read data is transmitted from the SD memory card 2 to the host terminal 1 using the clock CLKH as a trigger, and reaches the host terminal 1 as the clock using the clock CLKH2 as a trigger. The phase shift adjustment section 29 generates the clock CLK_R(0) having a phase shift of $2\Delta d$ with respect to the clock CLKH1 for adjusting the phase shift between the clock CLKH1 and the clock CLKH2. On the other hand, the inversed clock generation section 31 generates CLK_R(180) which is in anti-phase of the clock CLK_R(0). In this way, the host terminal 1 can receive the response and the read data from the SD memory card 2 based on the clock CLK_R(180) even when there is a phase shift of $2\Delta d$ due to the distance of the transmission path.

Next, the phase shift adjustment section 29 adjusts the clock CLK_R (0) based on a phase shift adjustment signal for adjusting a phase shift due to factor other than the distance of the transmission path as the second adjustment step. With reference to FIG. 2 again, the second phase adjustment step is described. For example, when a temperature of the SD memory card 2 changed after the communication with the host terminal 1 is started, and the delay time changes accordingly, degree of the phase shift also changes. Herein, delay time due to factor other than the distance of transmission path is assumed to be $\Delta t$. A phase synchronization pattern reception section 23, a phase shift detection section 25, and the control signal generation section 27, which will be further described, detect a phase shift of $\Delta t$ due to factor other than the distance of the transmission path, and output a phase adjustment signal for adjusting the phase shift of $\Delta t$ to the phase shift adjustment section 29. The phase shift adjustment section 29 generates CLK_R (0)' which is obtained by adjusting the phase of the CLK_R (0) based on the phase adjustment signal. The inversed clock generation section 31 generates CLK_R (180)' which is in anti-phase of the CLK_R (0)'. The second phase adjustment step is performed every time data is received from the SD memory card after the communication is started. In this way, the host terminal 1 can receive the response and the read data correctly from the SD memory card 2 based on the clock CLK_R(180)' with the phase shift being adjusted even when there is a phase shift of $\Delta t$ due to factor other than the distance of the transmission path.

Figure 1B:
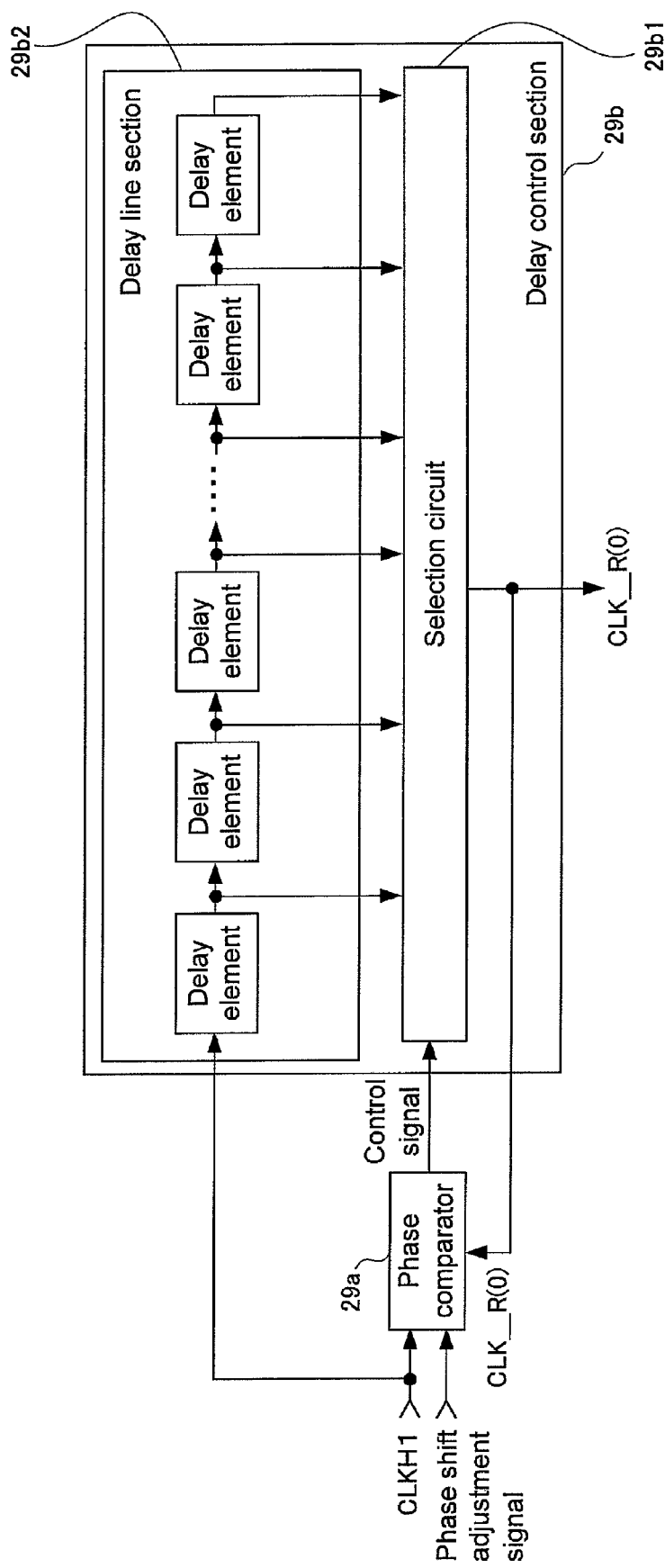
FIG. 1B shows a specific example of a phase shift adjustment section.

Now, an example of the phase shift adjustment section 29 is described. FIG. 1B shows a specific example of the phase shift adjustment section 29. The phase shift adjustment section 29 is formed of, for example, delay locked loop (DLL) as shown in FIG. 1B, and includes a phase comparator 29a and a delay control section 29b.

The delay control section 29b includes a selection circuit 29b1 and a delay line section 29b2 which is formed of a plurality of delay elements.

First, the phase shift adjustment section 29 generates a plurality of delay clock with phases being varied gradually with respect to the clock CLKH1 by the delay line section 29b. It is assumed that either one of the delay clock is selected and output as the clock CLK_R(0) by the selection circuit 29b1.

When a phase shift is detected by the phase shift detection section 25, the control signal generation section 27 generates a phase shift control signal, which is input to the phase comparator 29a of the phase shift adjustment section 29. Herein, the phase shift adjustment signal is a signal for adjusting the phase shift of $\Delta t$ due to factor other than the distance of the transmission path.

The phase comparator 29a transmits a control signal to the selection circuit 29b1 based on the phase shift adjustment signal. The selection circuit 29b1 determines that which of the plurality of the delay clocks from the delay line section 29b2 should be selected and output based on the control signal.

The phase comparator 29a always compares the clock CLKH1 and fed back clock CLK_R(0) whether they are shifted by the phase shift amount indicated by the phase shift adjustment signal, and transmits a control signal to the selection circuit 29b1. In this way, the phase shift adjustment section 29 generates clock CLK_R(0) with the phase being adjusted.

The inversed clock generation section 31 outputs the clock CLK_R(0) and the clock CLK_R(0)' to the phase synchronization pattern reception section 23, and outputs the clock CLK_R(180) and the clock CLK_R(180)' to the phase synchronization pattern reception section 23, the response reception section 19, and the read data reception section 21.

(d) Response Reception Section, Read Data Reception Section 21

When the various commands are transmitted from the command transmission section 17 to the SD memory card 2, the SD memory card 2 transmits a reply to the command, which is a packet including response, to the host terminal 1. The response reception section 19 receives a response from the response packet received from the SD memory card 2 based on the clock CLK_R(180).

When the command transmission section 17 transmits the read command to the SD memory card 2, the SD memory card 2 transmits the response packet and a read data packet including read data to the host terminal 1. The read data reception section 21 receives the read data from the read data packet received from the SD memory card based on the clock CLK_R(180).

When only the phase of 2Δd due to the distance of the transmission path is generated between the clock CLKH1 and the clock CLKH2, the host terminal 1 can correctly receive the response and the read data based on the clock CLK_R (180).

The response packet as mentioned above is a first packet transmitted from the SD memory card 2 in response to the various commands from the host terminal 1, and includes a phase synchronization pattern. Herein, the phase synchronization pattern is a pattern for the host terminal 1 to synchronize the clock CLK_R(180) for obtaining the response and the read data transmitted from the SD memory card 2 to the response and the read data transmitted from the SD memory card 2, i.e., a pattern for adjusting the phase which allows suitable reception of the response and the read data. The read data packet does not have to include the phase synchronization pattern, or may include intermittently. The structure of the phase synchronization pattern will be further described below.

(e) Phase Synchronization Pattern Reception Section

When the phase synchronization pattern reception section 23 receives an Enable signal of "H" from the control signal generation section 27, it obtains a signal value of the phase synchronization pattern included in the response packet based on the clock CLK_R(0) and/or the clock CLK_R(180). Herein, the Enable signal is a signal for obtaining the phase synchronization pattern from packets, and when the Enable signal indicates "H", for example, the phase synchronization pattern is allowed to be obtained. The phase synchronization pattern reception section 23 obtains a phase synchronization pattern when it receives the Enable signal from the control signal generation section 27, and the phase synchronization pattern is included in the read data packet.

The phase synchronization pattern reception section 23 outputs a signal value of the obtained phase synchronization pattern to the phase shift detection section 25.

(f) Phase Shift Detection Section, Control Signal Generation Section

The control signal generation section 27 generates an Enable signal based on the various commands received from the command generation section 15, and outputs to the phase synchronization pattern reception section 23.

The phase shift detection section 25 receives a signal value of the phase synchronization pattern from the phase synchronization pattern reception section 23, and detects a phase shift of Δt due to factor other than the distance of the transmission path. Herein, detection of a phase shift may mean detection of whether there is a phase shift or not, or may mean detection of degree of a phase shift. The phase shift adjustment section 29 outputs the result of detection of a phase shift to the control signal generation section 27. The control signal generation section 27 generates a phase shift adjustment signal for adjusting a phase shift of Δt due to factor other than the distance of the transmission path, and outputs to the phase shift adjustment section 29.

The functional structure of the host terminal 1 as described above is described to the extent that is related to the SD memory card 2, and other structure may be included as well.

(1-2) SD Memory Card

Next, the functional structure of the SD memory card 2 will be described.

(a) Clock Reception Section, Command Reception Section

A clock reception section 41 receives clock CLKS having delay time of Δd with respect to the clock CLKH1 from the clock transmission section 13 of the host terminal 1. The clock reception section 41 outputs the received clock CLKS to functional sections of the SD memory card 2.

A command reception section 43 receives the various commands from the command transmission section 17 of the host terminal 1 and outputs to a packet generation section 47.

(b) Phase Synchronization Pattern Generation Section

A phase synchronization pattern generation section 45 generates a phase synchronization pattern based on the clock CLKS. Herein, the phase synchronization pattern refers to a pattern for the host terminal 1 to adjust the clock CLK_R (180) for obtaining the response and read data transmitted from the SD memory card 2 to the phase which allows appropriate reception of the response and the read data transmitted from the SD memory card 2.

The phase synchronization pattern includes a first level signal which lasts for at least two cycles and a second level signal which lasts for one cycle following the first level signal. For example, the phase synchronization pattern may be formed of 3 bits of "001" or "110". Alternatively, the phase synchronization pattern may be formed of: three or more consecutive "0"s and "1" which follows; three or more consecutive "1"s and "0" which follows; three or more consecutive "0"s and two or more "1"s which follow; three or more consecutive "1"s and two or more "0"s which follow; and so on. In view of data transmission efficiency, the shortest phase synchronization pattern, "001" or "110" is preferable.

The phase synchronization pattern such as "001", "00011" or the like may vary among the first level limit value which corresponds to the first level signal and the second level limit value which corresponds to the second level signal. In the phase synchronization pattern as mentioned above, the first level signal lasts for two cycles or more before the second level signal of one cycle so that the signal value of the first level signal varies as it approaches the first level limit value and then moves to the second level. Accordingly, the entire phase synchronization pattern shifts toward the first level. Since the entire phase synchronization pattern shifts to the first level as such, and change in the signal value is significant at an edge where the signal moves from the first level to the second level, the signal value when there is a phase shift and the signal value when there is no phase shift differs even with a slight phase shift. Thus, the host terminal can sensitively and precisely detect a phase shift based on the signal value at the point of change from the first level to the second level, and can adjust the phases of the clock CLK_R(0) and the clock CLK_R(180) based on the detected phase shift.

The phase synchronization pattern includes a first level signal which lasts for at least two cycles, a second level signal which lasts for one cycle following the first level signal, and a first level signal which last for at least one cycle following the second level signal. For example, the phase synchronization pattern may be formed of 4 bits of "0010" or "1101". Alternatively, the phase synchronization pattern may be formed of: three or more consecutive "0"s, "1" which follows, and "0" which follows; three or more consecutive "1"s, "0" which follows, and "1" which follows; three or more consecutive "0"s, "1" which follows, and two or more "0"s which follow; three or more consecutive "1"s, "0" which follows, and two or more "1"s which follow; and so on. In view of data transmission efficiency, the shortest phase synchronization pattern, "0010" or "1101" is preferable.

In the phase synchronization pattern such as "0010", "000100", the first level signal lasts for two cycles or more before the second level signal of one cycle so that the signal value of the first level signal changes such that it first approaches the first level limit value and then moves to the second level. Then, the second level signal lasts for only one cycle, and then it changes to the first level signal. Accordingly, the entire phase synchronization pattern shifts toward the first level, and thus, the maximum absolute value of amplitude of the phase synchronization pattern becomes small, and a time period during which the absolute value of the signal value of the second level signal exceeds the threshold of the second level becomes short. This means that a time period during which the phase synchronization pattern indicates the second level becomes short. The threshold of the second level is a reference value for determining whether the signal value is at the second level or not, and when the absolute value of the signal value exceeds the threshold, the signal value is determined to be at the second level. When the phase synchronization pattern is "0010", "000100", or the like, the host terminal cannot recognize the second level signal as the second level signal even with a slight phase shift since the time period of the second level of the phase synchronization pattern is short. By decreasing the time period of the second level and narrowing the allowance of the phase shift, the host terminal 1 can sensitively and precisely detect a phase shift even when the phase shift is small.

The phase synchronization patterns such as "001", "00011", "0010", "000100" and the like as described above are formed of relatively short pattern. The phase synchronization pattern is attached to packetized response, read data or the like and transmitted to the host terminal 1. Since the phase synchronization pattern is short, its proportion in the packet is small. Thus, transmission efficiency of the response, read data and the like can be improved.

In the above description, regarding the phase synchronization pattern "0010", "000100" or the like, the phase shift is detected based on the signal value of the phase synchronization pattern near the maximum value of the amplitude. However, similarly to the phase synchronization pattern such as "001", "00011" and the like, the phase shift can be detected based on the signal value of the phase synchronization pattern at the edge where the signal level moves from the first level to the second level. Alternatively, a method of detecting a phase shift based on a signal value of the phase synchronization pattern near the maximum value of the amplitude and a method of detecting a phase shift based on a signal value of the phase synchronization pattern obtained at the edge where the signal value moves from the first level to the second level may be used together. As long as a phase shift is detected sensitively and precisely using the phase synchronization pattern according to the present invention, any phase shift detection method can be applied.

The phase synchronization pattern may also serve as a start bit which is a signal for indicating a start position or an end position of the response and/or read data included in the packet. For example, if a start bit is "00", "00" of the phase synchronization pattern formed of "0010" also serves as the start bit. Alternatively, a start bit and the phase synchronization pattern may be the same, for example, if a start bit is "0010", the start bit and the phase synchronization pattern formed of "0010" are the same. Alternatively, the phase synchronization pattern may be included in a start bit. For example, if a start bit is "000010", the phase synchronization pattern which is "0010" is included in this start bit. The phase synchronization pattern also serves as a start signal, the number of bits required for the start bit and the phase synchronization pattern can be decreased, and the number of bits other than the response and the read data in the packets can be decreased. Accordingly, the transmission efficiency of the response and read data from the SD memory card 2 to the host terminal 1 can be further improved. The start bit may be attached immediately before the phase synchronization pattern, immediately after the phase synchronization pattern, or both immediately before and after the phase synchronization pattern. The host terminal 1 can recognize the start position and the end position of the phase synchronization pattern, and can correctly detect a phase shift.

For example, if the idle state of the system is indicated by consecutive "1"s, the phase synchronization pattern of "0010" is attached after the idle state is finished. Thus, the content of packet being transmitted is, for example, " . . . 11110010 . . . ". If the idle state of the system is indicated by consecutive "0"s, the phase synchronization pattern of "1101" is attached after the idle state is finished. Thus, the content of packet being transmitted is, for example, " . . . 00001101 . . . ". This can also allow recognition of start position for phase synchronization. Furthermore, a start bit may be further attached.

In the above description, the phase synchronization pattern is transmitted one bit by one bit for each cycle of the clock CLKS. However, the present invention is not limited to such a structure. For example, with double data rate (DDR), the phase synchronization pattern of 2 bits can be transmitted for each cycle of the clock CLKS. When the phase synchronization pattern is transmitted one bit by one bit for each cycle of the clock CLKS as described above, the internal reception clock for receiving the response and the read data is the clock CLK_R (180). On the other hand, in DDR transmission, the response and the read data are received at both edges of rising edge and falling edge of the clock CLK_R (180). Thus, in the DDR transmission, the internal reception clock for receiving the response and the read data is clock CLK_R (90) which has a phase shifted by 90 degrees with respect to the response and the read data.

(c) Packet Generation Section, Storage Section

A storage section 49 stores various information such as video, audio and the like as read data. In the case of the SD memory card 2, the storage section 49 is formed of flash memory, which is nonvolatile memory.

When the packet generation section 47 receives the various commands from the command reception section 43, it first generates a response packet for the command based on the clock CLKS. At this time, the packet generation section 47 attaches the phase synchronization pattern to the response packet. The phase synchronization pattern is attached to the head of to the response packet and the response follows the phase synchronization pattern. The phase synchronization pattern may be attached to before and after the response. In such a case, the host terminal 1 can detect a phase shift with the phase synchronization pattern in front of the response, adjust the phase shift while the response is being received, and re-check a phase shift with the phase synchronization pattern after the response.

Further, packet generation section 47 reads out the read data in the storage section 49 in response to the read command, and sequentially packetize to generate a read data packet.

A method for attaching the phase synchronization pattern to the packet may be as follows. First, the phase synchronization pattern is attached to only at least the first packet which responds to the command, i.e., only the response packet. The host terminal 1 which receives the response packet performs phase adjustment before it receives the read data. Thus, the host terminal 1 can correctly receive the read data included in the packets following the response packet. Since the phase synchronization pattern is a short pattern, transmission efficiency from the SD memory card 2 to the host terminal 1 can be improved. If the phase synchronization pattern is attached to only the first packet, transmission efficiency of the read data can be further improved.

Secondly, the phase synchronization pattern is attached to all the packets generated in response to the command. In other words, the phase synchronization pattern is attached to the response packet and the read data packet. By attaching the phase synchronization pattern to all the packets, the host terminal 1 can always perform phase adjustment to synchronize the phase, and the response and the read data can be received further correctly. Since the phase synchronization pattern according to the present invention is a pattern made from short bits as described above, transmission efficiency can be improved at the same time.

Thirdly, the phase synchronization pattern is attached to the read data packet intermittently. In this way, burden of transmission due to transmitting the phase synchronization pattern from the SD memory card 2 to the host terminal 1 can be reduced. With the phase being synchronized, transmission efficiency of the response and the read data from the SD memory card 2 to the host terminal 1 can be improved.

The packet generation section 47 may transmit the response included in the response packet with divided-by-n frequency clock which is obtained by dividing CLKS by n (n>1). For example, when it is determined that there is a phase shift based on the phase synchronization pattern and phase adjustment is performed by the phase shift adjustment section 29, response is received during the phase adjustment is being performed. In such a case, the phase of the clock CLK_R (180) for efficiently obtaining the response is shifted from the phase of response. Accordingly, the response cannot be received correctly. Therefore, by transmitting the response with the divided-by-n frequency clock as described above, the host terminal 1 can securely receive the response immediately after the phase synchronization pattern by oversampling, and also, can adjust the phase while receiving the response.

(d) Response Packet Transmission Section, Read Data Packet Transmission Section

A response packet transmission section 51 and a read data packet transmission section 53 transmit a response packet and a read data packet generated by the packet generation section 47 to the host terminal 1 being triggered by the clock CLKS.

The path for command transmission and reception of the host terminal 1 and the SD memory card 2 and the path for transmission and reception of the response packet are formed of the same transmission path.

(2) Entire Flow

Figure 3:
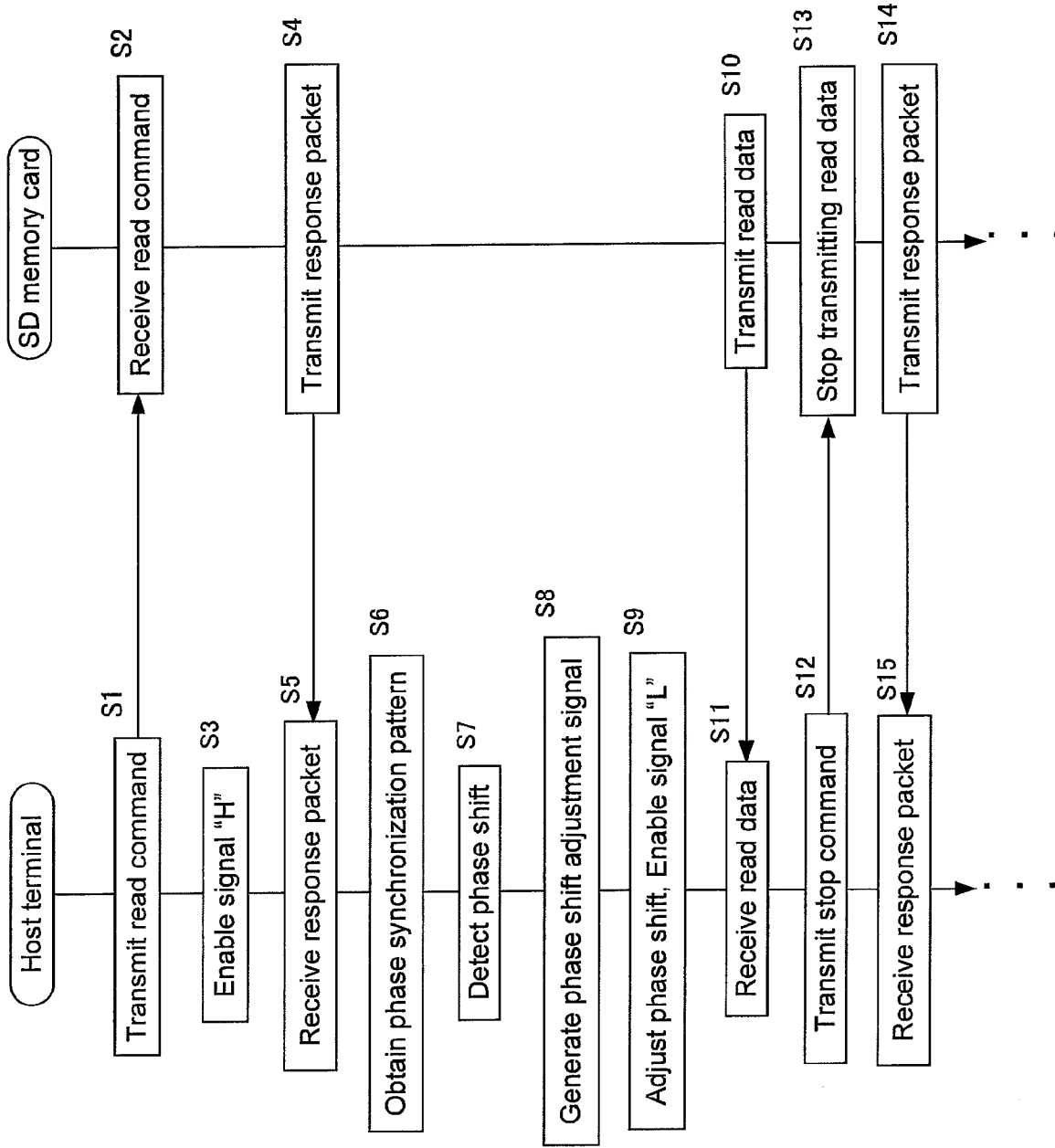
FIG. 3 is a flow chart showing an exemplary flow of transmission of command and data of the host terminal and the SD memory card.

FIG. 3 is a flow diagram of an exemplary flow of transmission and reception of commands and data between the host terminal 1 and the SD memory card 2. The clock generation section 11 of the host terminal 1 always generates clock and the clock transmission section 13 transmits clock CLKH1 to the SD memory card 2. It is assumed that clock CLK_R (0) and clock CLK_R (180) have been already generated.

Step S1: The command generation section 15 of the host terminal 1 generates, for example, a read command, and the command transmission section 17 transmits the read command to the SD memory card 2. The command generation section 15 also outputs the read command to the control signal generation section 27, and instructs the control signal generation section 27 to generate an Enable signal which activates detection of a phase shift.

Step S2: The command reception section 43 of the SD memory card 2 receives the read command from the host terminal 1 and transmits to the packet generation section 47.

Step S3: The control signal generation section 27 outputs the Enable signal as "H" based on the read command to allow detection of the phase synchronization pattern.

Step S4: The packet generation section 47 of the SD memory card 2 first generates a response packet with a phase synchronization pattern being attached in response to the read command.

Steps S5 and S6: The phase synchronization pattern reception section 23 of the host terminal 1 obtains a signal value of the phase synchronization pattern from the response packet transmitted from the SD memory card 2 based on the clock CLK_R (0) and the clock CLK_R (180). The response reception section 19 receives response from the response packet based on the clock CLK_R (180). The phase synchronization pattern reception section 23 outputs the obtained signal value of the phase synchronization pattern to the phase shift detection section 25.

Steps S7 and S8: The phase shift detection section 25 detects a phase shift of Δt due to a factor other than the distance of the transmission path, and outputs the detected result to the control signal generation section 27. The control signal generation section 27 generates a phase shift adjustment signal based on the detected result for the phase shift.

Step S9: The phase shift adjustment section 29 adjusts the phase shift of the clock CLK_R (0) based on the phase shift adjustment signal. The phase shift adjustment section 29 also stops detection of a phase shift by changing the Enable signal to "L". The inversed clock generation section 31 generates clock CLK_R (180)' based on the clock CLK_R (0)' after the phase has been adjusted.

Step S10: Next, the packet generation section 47 of the SD memory card 2 reads out the read data from the storage section 49 based on the read command, and sequentially generates read data packets. The read data packets may have the phase synchronization pattern not being attached or attached as appropriate.

Step S11: The read data reception section 21 of the host terminal 1 receives read data from the read data packet based on the clock CLK_R (180)'.

Step S12: When reading out of the read data between the host terminal 1 and the SD memory card 2 is completed, the command generation section 15 of the host terminal 1 generates a stop command, and the command transmission section 17 transmits the generated stop command to the SD memory card 2.

Steps S13 through S15: When the command reception section 43 of the SD memory card 2 receives the stop command, it outputs the command to the packet generation section 47 to stop generation of the read data packets. In this way, transmission of the read data packet to the host terminal 1 stops. The packet generation section 47 generates a response packet corresponding to the stop command with the phase synchronization pattern being attached, and the response packet transmission section 51 transmits the response packet to the host terminal 1. When the host terminal 1 receives the response packet, it performs process of steps S5 through S9 as described above. By attaching the phase synchronization pattern also to the response packet which corresponds to the stop command, a phase shift can be adjusted before the next read command is generated.

Figure 4:
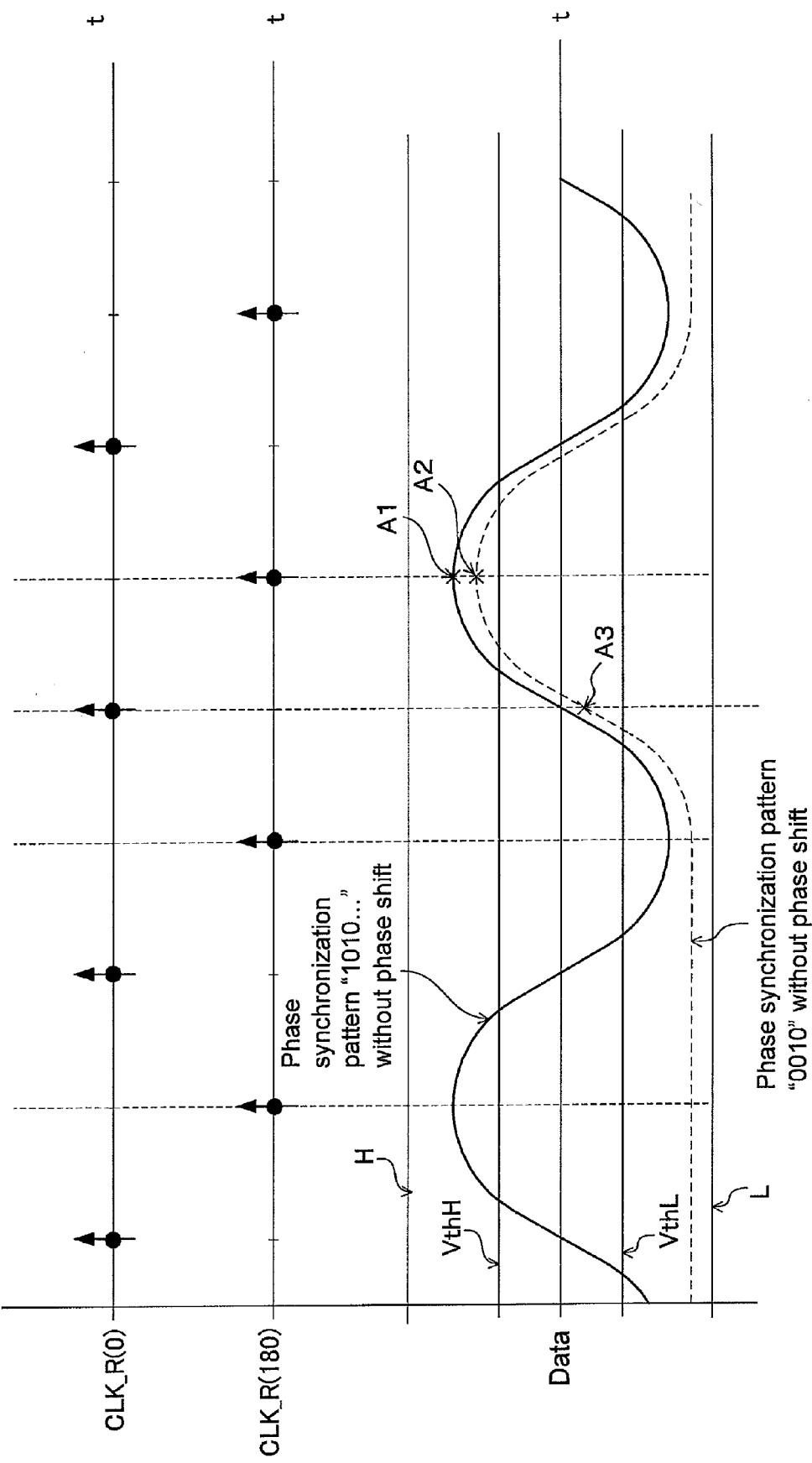
FIG. 4 is an illustrative diagram showing an example where there is no phase shift of Δt due to factor other than a distance of the transmission path.
Figure 5:
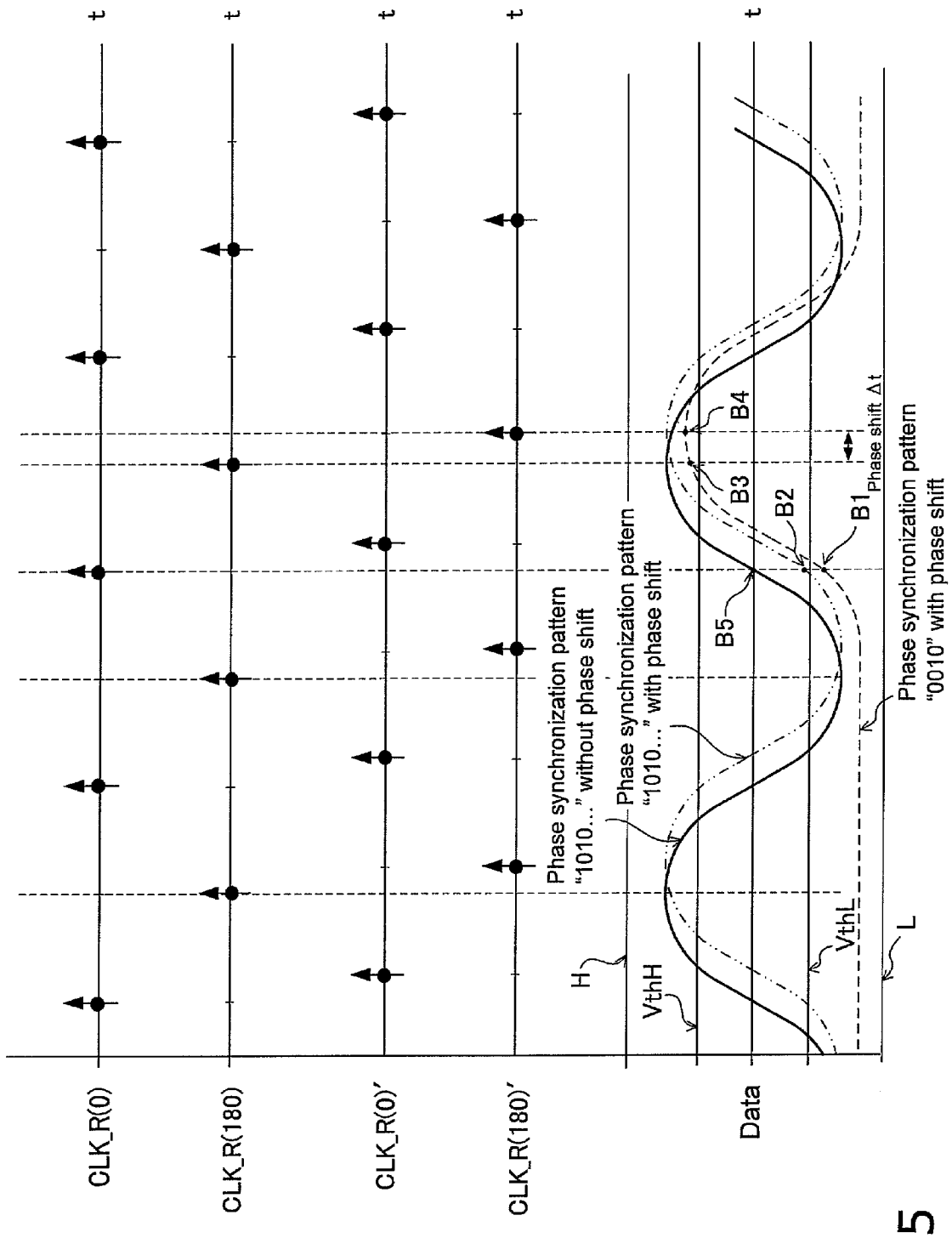
FIG. 5 is an illustrative diagram showing a detection method for a phase shift where there is a phase shift of Δt due to factor other than the distance of the transmission path.
Figure 6:
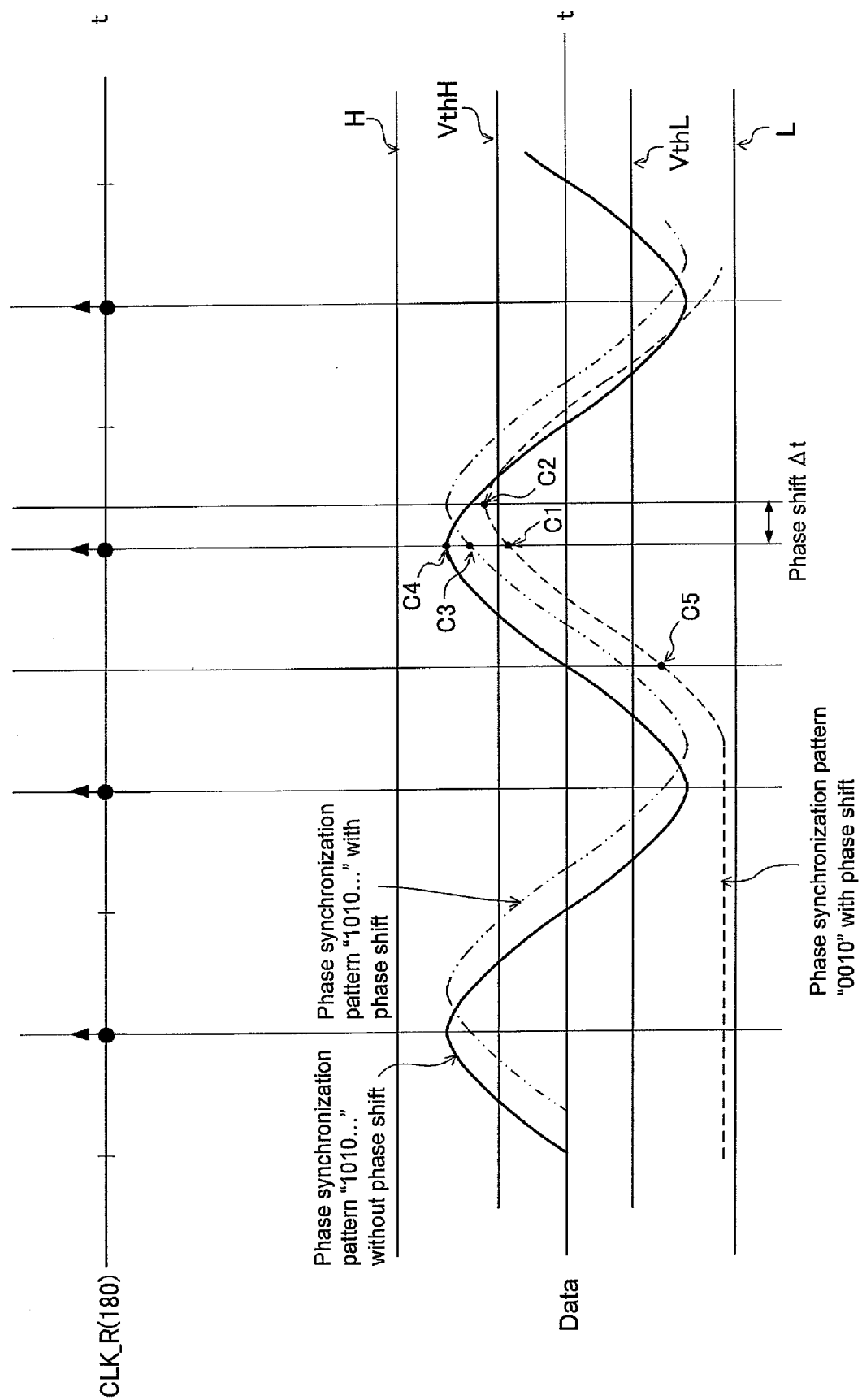
FIG. 6 is another illustrative diagram showing a detection method for a phase shift where there is a phase shift of Δt due to factor other than the distance of the transmission path.

(3) A Method for Detecting A Phase Shift Using A Phase Synchronization Pattern A method for detecting a phase shift using a phase synchronization pattern is described with reference to FIGS. 4 through 6. FIG. 4 is a diagram illustrating the case when a phase shift of Δt due to an factor other than the distance of the transmission path is not generated. FIG. 5 is a diagram illustrating a method for detecting a phase shift when a phase shift of Δt due to a factor other than the distance of the transmission path is generated. FIG. 6 is another diagram illustrating a method for detecting a phase shift when a phase shift of Δt due to a factor other than the distance of the transmission path is generated. Arrows shown on time axle of clock in FIGS. 4 through 6 indicate rising edges of respective clock.

As data to be transmitted from the SD memory card 2 to the host terminal 1, the phase synchronization pattern "0010" according to the present invention and a general synchronization pattern "1010 . . . " are explain and compared to each other. However, any other phase synchronization pattern according to the present invention can be considered in a similar way. The phase synchronization patterns vary between signal value "H" which corresponds to "1" and signal value "L" which corresponds to "0". The threshold value VthH is reference for the signal value to be determined to be "H" and the threshold value VthL is reference for the signal value to be determined to be "L". In other words, when the threshold value is VthH, or higher, it is determined to be "H", and when the threshold value is VthL or lower, it is determined to be "L". A waveform of data shown in FIGS. 4 through 6 is one after transmission delay of 2Δd due to the transmission path between the host terminal 1 and the SD memory card 2 is considered.

(3-1) No Phase Shift

FIG. 4 is a diagram illustrating the case when the clock CLK_R(0) and the clock CLK_R(180) which are trigger for the host terminal 1 to receive the phase synchronization pattern and the phase of the data transmitted from the SD memory card are in synchronization. Among data received by the host terminal 1 from the SD memory card 2, the phase synchronization pattern "1010 . . . " without a phase shift is indicated by solid line, and the phase synchronization pattern "0010" of the present invention without a phase shift is indicated by broken line. The host terminal 1 obtains data transmitted from the SD memory card 2 at the rising edge of the clock CLK_R (180). Thus, the host terminal 1 can obtain the signal value "H" correctly with respect to the signal value "H" which should be received at A1 point of the phase synchronization pattern "1010 . .".

A waveform of phase synchronization pattern "0010" received by the host terminal 1 changes to "H" after it approaches near the limit value of "L" since "L" lasts for two cycles before "H". Since "H" lasts for only one cycle, the waveform immediately changes toward "L" once it is changed to "H". Thus, in the phase synchronization pattern "0010", a time period of being threshold VthH or higher to be determined to be "H" becomes short. However, since the clock CLK_R (180) for the host terminal 1 to obtain the phase synchronization pattern and the phase of the phase synchronization pattern are in synchronization, the host terminal 1 obtains the signal value "H" correctly with respect to the signal value "H" which should be received at A2 point of the phase synchronization pattern "0010". The host terminal 1 determines that there is no phase shift based on that it obtains the correct signal value "H" with respect to the signal value "H" which should be received at the rising edge of the clock CLK_R (180) after the signal value of the phase synchronization pattern "0010" changes from "L" to "H". If the phase of the phase synchronization pattern "0010" and the clock CLK_R (180) are shifted, the host terminal 1 cannot obtain the signal value "H" at the rising edge of the clock CLK_R (180).

Alternatively, whether there is a phase shift or not may be determined based on the signal value at the point where signal value changes from "L" to "H" in the phase synchronization pattern "0010". In such a case, at the rising edge of the clock CLK_R (0), the signal value at point A3 where the signal value changes in the phase synchronization pattern "0010" is obtained. In the example shown in FIG. 4, point A3 is between the threshold value VthH and the threshold value VthL. Thus, the signal value is either "L" or "H". If the signal value is obtained at point A3 for several times, and the signal values are always "L" or "H", it is determined that there is no phase shift.

Furthermore, the signal value at the change point of the phase synchronization pattern "0010" may be obtained at the rising edge of the clock CLK_R (0), and the signal value may be obtained at the rising edge of the clock CLK_R (0) after the signal value of the phase synchronization pattern "0010" is changed from "L" to "H" to determine whether there is a phase shift or not. In this way, the presence of the phase shift is double-checked, and judgment error can be eliminated. For example, the signal value at point A3 is either "L" or "H", and it is determined that there is no phase shift if the signal value at point A2 is always "H".

(3-2) With Phase Shift

FIGS. 5 and 6 are diagrams illustrating the case where phases of the clock CLK_R (0) and the clock CLK_R(180) which are triggers for the host terminal 1 to receive the phase synchronization pattern and the data to be transmitted from the SD memory card 2. The phase shift in FIGS. 5 and 6 is assumed to be Δt which is due to factor other than the distance of the transmission path.

First, FIG. 5 is described. In FIG. 5, phase synchronization pattern "1010 . . . " without a phase shift is indicated by solid line, and phase synchronization pattern "1010 . . . " with a phase shift is indicated by long dashed double-short dashed line. The phase synchronization pattern "0010" according to the present invention with a phase shift is indicated by broken line. The phase synchronization pattern "1010 . . . " and the phase synchronization pattern "0010" according to the present invention both have the phase shifted by that of the clock CLK_R(180) by Δt.

The host terminal 1 detects a phase shift based on the signal value at the change point from "L" to "H" in the phase synchronization pattern "0010". In such a case, at the rising edge of the clock CLK_R (0), the signal value at point B1 where the signal value of the phase synchronization pattern "0010" changes is obtained. In the example shown in FIG. 5, point B1 is lower than the threshold value VthL. Thus, the signal value is "L". When there is no phase shift, the signal value is obtained at point A3 shown in FIG. 4 as described above. Thus, the signal value is either "L" or "H". When the signal value is obtained at point B1 for several times, it is determined that there is a phase shift if the signal value is always "L" for several times.

In a waveform of the phase synchronization pattern "0010" shown inn FIG. 5, a period for which the signal value is determined to be "H" which is higher than the VthH is relatively long. In such a waveform, if the signal value of the phase synchronization pattern "0010" is obtained based on the clock CLK_R (180) after the signal value of the phase synchronization pattern "0010" changes from "L" to "H", it cannot be determined that there is a phase shift even there is a phase shift in some degree. For example, the host terminal 1 obtains the signal value at point B3 of the phase synchronization pattern "0010" at the rising edge of the amplitude of the clock CLK_R (180). If there is no phase shift Δt, point B4 is located at the rising edge of the clock CLK_R (180), and the signal value thereof is "H". Point B3 is still within a period where the signal value is threshold VthH or higher, and thus, the signal value thereof is "H". Accordingly, in the waveform of the phase synchronization pattern "0010" shown in FIG. 5, the host terminal 1 cannot judge that there is a phase shift even when there is one. Thus, as described above, the signal value is obtained based on the rising edge of the clock CLK_R (0) at the change point where the signal value changed to "H" from "L", and determined whether there is a phase shift or not based on whether signal value is "L" or not. In this way, it becomes possible to judge whether there is a phase shift or not in more sensitive manner.

Further, when a phase shift is detected based on the rising edge of the clock CLK_R (0), the phase shift can be detected and adjusted before the rising edge of the clock CLK_R (180) where the data is actually obtained. Accordingly, it becomes possible for the host terminal 1 to accurately obtain data at the rising edge of the clock CLK_R (180).

When the signal value of the phase synchronization pattern "1010 . . . " is obtained at point B2 based on the rising edge of the clock CLK_R (0), the signal value at point B2 is either "L" or "H" since point B2 is between VthH and VthL. Similarly, when the signal value of the phase synchronization pattern "1010 . . . " without a phase shift is obtained at point B5 based on the rising edge of the clock CLK_R (0), the signal value is either "L" or "H". Therefore, in the phase synchronization pattern "1010 . . . ", it is not possible to detect a phase shift even when the signal value is obtained based on the rising edge of the clock CLK_R (0) at the change point of the phase synchronization pattern. On the other hand, in the phase synchronization pattern "0010" of the present invention, as described above, "L" lasts for a plurality of times of detection, and the signal value approaches to the limit of "L" and changes to "H". Thus, the entire phase synchronization pattern is shifted toward "L". Therefore, and also, since it is the change point of the signal value, even with a slight phase shift, the signal value when there is a phase shift and the signal value when there is no phase shift vary from each other. Thus, even the slight phase shift can be detected. In other words, in the phase synchronization pattern "1010 . . . ", both the signal value at point B5 when there is no phase shift and the signal value at point B2 when there is a phase shift are either "L" or "H". Thus, a phase shift cannot be detected. However, in the phase synchronization pattern "0010" of the present invention, the signal value at point A3 when there is no phase shift as shown in FIG. 4 is either "L" or "H", and the signal value at point B1 when there is a phase shift is always L. Thus, a phase shift can be detected. In this way, in the phase synchronization pattern "1010 . . . " and the phase synchronization pattern "0010" of the present invention, even with the same phase shift Δt, a phase shift which cannot be detected in the phase synchronization pattern "1010 . . . " can be detected in the phase synchronization pattern "0010" of the present invention.

As described above, by using the phase synchronization pattern "0010" of the present invention, and obtaining the signal value of the phase synchronization pattern based on the rising edge of the clock CLK_R (0) at the change point where the signal value of the phase synchronization pattern significantly changes, a phase shift can be judged in sensitive manner.

Alternatively, a signal value at the change point of the phase synchronization pattern "0010" may be obtained at the rising edge of the clock CLK_R (0) and also a signal value may be obtained at the rising edge of the clock CLK_(180) after the signal value of the phase synchronization pattern "0010" is changed from "L" to "H" to determine whether there is a phase shift or not. In this way, a phase shift can be double-checked, and judgment error can be eliminated. For example, it is determined that there is a phase shift when the signal value at point B1 is always "L" and the signal value at point B3 is always "L" or "H".

When the phase shift is detected as described above, the host terminal 1 adjusts the phase of the clock CLK_R (0) and the clock CLK_R (180) so as to be in synchronization of the phase of the phase synchronization pattern from the SD memory card 2. In this way, the clock CLK_R (0)' and the clock CLK_R (180)' are generated, and the host terminal 1 can correctly receive data from the SD memory card 2 based on the clock CLK_R (180)'.

Next, FIG. 6 is explained. In FIG. 6, similarly to FIG. 5, phase synchronization pattern "1010 . . . " without a phase shift is indicated by solid line, and phase synchronization pattern "1010 . . . " with a phase shift is indicated by long dashed double-short dashed line. The phase synchronization pattern "0010" according to the present invention with a phase shift is indicated by broken line. Unlike the waveform of phase synchronization pattern "0010" shown in FIG. 5, the waveform of the phase synchronization pattern "0010" shown in FIG. 6 has relatively short period during which the signal value is determined to be "H" which is higher than VthH. In such a waveform, whether there is a phase shift or not can be determined by obtaining the signal value of the phase synchronization pattern at the rising edge of the clock CLK_R (180) after the signal value of the phase synchronization pattern "0010" changes from "L" to "H". In such a case, at the rising edge of the clock CLK_R (180), the host terminal 1 obtains the signal value at point C1 of the phase synchronization pattern "0010". In the example shown in FIG. 6, point C1 is lower than the threshold value VthH. Thus, the signal value is either "L" or "H". If there is no phase shift, the signal value is obtained at C2, and thus, it is "H". The signal value is obtained at point C1 for several times, and if the signal values are always "L" or "H", it is determined that there is a phase shift.

In this example, when the signal value of the phase synchronization pattern "1010 . . . " is obtained at point C3 based on the rising edge of the clock CLK_R (180), the signal value at point C3 is "H" because point C3 is higher than VthH. Similarly, when the signal value of the phase synchronization pattern "1010 . . . " without a phase shift is obtained at point C4 based on the rising edge of the clock CLK_R (180), the signal value is "H". Thus, in the phase synchronization pattern "1010 . . . ", a phase shift cannot be detected by obtaining the signal value based on the rising edge of the clock CLK_R (180) after the signal value changes from "L" to "H". On the other hand, in the phase synchronization pattern "0010" of the present invention, as described above, "L" lasts, and the signal value approaches to the limit of "L" and changes to "H". Thus, the entire phase synchronization pattern is shifted toward "L". Therefore, the period during which the signal value is "H" in the phase synchronization pattern "0010" becomes shorter than the period during which the signal value is "H" in the phase synchronization pattern "1010...". In this way, allowance for the phase shift is narrowed by using the phase synchronization pattern "0010", and even a slight phase shift can be detected. In other words, in the phase synchronization pattern "1010...", the signal value at point C4 when there is no phase shift and the signal value at point C3 when there is a phase shift are the same. Thus, phase shift cannot be detected. However, in the phase synchronization pattern "0010" of the present invention, the signal value at point C1 when there is no phase shift, and the signal value at point C2 when there is a phase shift are different. Thus, a phase shift can be detected. In this way, in the phase synchronization pattern "1010..." and the phase synchronization pattern "0010" of the present invention, even with the same phase shift Δt, a phase shift which cannot be detected in the phase synchronization pattern "1010..." can be detected in the phase synchronization pattern "0010" of the present invention.

As described above, by using the phase synchronization pattern "0010" of the present invention, and obtaining the signal value of the phase synchronization pattern based on the rising edge of the clock CLK_R (180) at the change point where the signal value of the phase synchronization pattern changes from "L" to "H", a phase shift can be judged in sensitive manner.

Alternatively, a phase shift may be detected by obtaining the signal value based on the rising edge of the clock CLK_R (0) at the change point where the signal value of the phase synchronization pattern "0010" significantly changes. In such a case, at the rising edge of the clock CLK_R (0), the signal value at point C5 where the signal value of the phase synchronization pattern "0010" changes is obtained. In the example shown in FIG. 6, point C5 is lower than the threshold value VthL. Thus, the signal value is "L". When there is no phase shift, the signal value is obtained at point A3 shown in FIG. 4 as described above. Thus, the signal value is either "L" or "H". When the signal value is obtained at point C5 for several times, it is determined that there is a phase shift if the signal value is always "L" for several times.

Further, it may be determined whether there is a phase shift by obtaining the signal value at the change point of the phase synchronization pattern "0010" at the rising edge of the clock CLK_R (0) and obtaining the signal value at the rising edge of the clock CLK_R (180) after the signal value of the phase synchronization pattern "0010" is changed from "L" to "H". In this way, the phase shift is double-checked, and judgment error can be eliminated. For example, if the signal value at point C5 is always "L", and the signal value at point C1 is either "L" or "H", it is determined that there is a phase shift.

(4) Functions

As described above, the host terminal 1 synchronize the phase of the clock CLK_R (180) for the host terminal 1 to obtain data from the SD memory card 2 to the phase of the data transmitted by the SD memory card 2 to the host terminal 1 with the phase synchronization pattern of the present invention. Accordingly, the host terminal 1 can receive the response, read data and the like from the SD memory card 2 correctly and without a missing portion.

Further, the phase synchronization pattern of the present invention is formed of relatively short pattern as described above. The phase synchronization pattern is attached to the packetized response, read data and the like and is transmitted to the host terminal 1. Since the phase synchronization pattern is short, its proportion in the packet is small. Accordingly, transmission efficiency of the response, read data and the like cam be improved.

Furthermore, by using the phase synchronization pattern of the present invention, the host terminal 1 can detect sensitively and precisely even a slight phase shift as described above.

The delay time of the transmission path between the SD memory card 2 and the host terminal 1 varies depending upon the distance of the transmission path, and also varies momentarily depending upon reasons other than the distance of the transmission path such as temperature change. However, even a phase shift is generated due to such delay, the phase of the clock CLK_R (180) is adjusted to the phase which allows appropriate reception of data from the removable memory device for every response to the read command, for example. Further, with the phase synchronization pattern of the present invention, a phase shift can be detected sensitively and precisely and the phase shift can be adjusted. As described above, by sensitively and precisely detecting a phase shift for every response to the read command, for example, and correcting the phase shift, the ratio of the delay with respect to the clock CLK_R (180) can be suppressed even when the clock CLK_R (180) becomes a signal of high frequency. Therefore, the host terminal is not influenced by the change in the delay time or the like, and the response, the read data and the like transmitted from the removable memory device can be received correctly without a missing portion even the transmission frequency of the clock CLK_R (180) is increased.

Herein, the SD memory card 2 transmits/receives data based on the clock supplied by the host terminal 1 and does not transmit data to the host terminal 1 based on the clock of the SD memory card 2 itself. In other word, the clock used for the data transmission from the SD memory card 2 to the host terminal 1 is the clock transmitted from the host terminal 1 to the SD memory card 2. Thus, the host terminal 1 and the SD memory card 2 transmit and receive data based on the same clock. The frequency of the clock transmitted from the host terminal 1 to the SD memory card 2 and the frequency of the clock transmitted from the SD memory card 2 to the host terminal 1 are the same. The frequency does not change depending upon delay. Thus, the host terminal 1 does not have to adjust the frequency of the clock, and only the phase shift generated due to delay has to be adjusted as described above. Therefore, adjustment can be performed more easily than in the case where both the frequency adjustment and phase adjustment have to be performed. Further, for the frequency adjustment, frequency and phase are synchronized by feedback control using phase locked loop (PLL) in general. This takes a time period on the order of microseconds. If only phase shift has to be adjusted as in the present invention, adjustment can be easily performed in a short period of time. In view of this point as well, the present invention which allows adjustment of only phase shift enable adjustment to be easy and be performed in a short period of time. Further, since the clock of the SD memory card 2 itself is not transmitted to the host terminal 1, a signal line for supplying clock from the SD memory card 2 to the host terminal 1 is not necessary.

Other Embodiments (1) In the embodiment above, an SD memory card is described as an example of the removable memory device which transmits/receives data to/from the host terminal. However, the present invention is applicable not only to the SD memory card but to any portable device which transmits read data to the host terminal with clock supplied by the host terminal. For example, other examples may be, Compact Flash®, smart media, multimedia card, memory sticks, or the like. Further, memory to which the removable memory device can be incorporated is not limited to flash memory, but may be nonvolatile memory such as MRAM, FeRAM and the like.

(2) The phase adjustment may be performed at once rather than be separated into two steps, i.e., the first phase adjustment step and the second phase adjustment step. Specifically, a phase shift of 2Δd due to the distance of the transmission path and a phase shift of Δt due to factor other than the distance of the transmission path may be detected and adjusted at once at the phase shift detection section 25.

(3) The SD memory card receives transmission/reception clock for transmitting data to the host terminal from the host terminal, and the transmission/reception section of the SD memory card is controlled by the transmission/reception clock. However, as long as transmission of the data is controlled by the transmission/reception clock from the host terminal, data reading out clock from flash memory inside the SD memory card and the like, for example, does not have to be controlled by the transmission/reception clock transmitted from the host terminal.

(4) In the present invention, as long as a phase shift can be detected, degree of the phase shift does not have to be detected. However, the degree of the phase shift may be detected, and the phase adjustment may be performed in accordance with the degree of the phase shift.

(5) A computer program for enabling computer to execute the method described above and computer readable media on which such a computer program is recorded are within the scope of the present invention. Herein, the computer readable media may be, for example, flexible discs, hard discs, CD-ROMs, MOs, DVDs, DVD-ROMs, DVD-RAMs, Blue-ray discs (BD), or semiconductor memory.

The above-mentioned computer program is not limited to the one recorded on the recording media, but may be the one transmitted via telecommunication network, wireless or wired communication line, networks such as Internet, and the like.

The present invention is applicable to SD memory cards and host terminals used in various environments. Also, the present invention is effective with SD memory cards which operate at high frequencies.

The invention claimed is:

1. A removable memory device that transmits/receives data to and from a host terminal, comprising:
   a clock reception section that receives a transmission/reception clock, which has a cycle and which is used for transmitting/receiving data between the host terminal and the removable memory device, from the host terminal;
   a generation section that generates a phase synchronization pattern, which is for adjusting a phase of an internal reception clock which the host terminal incorporates for receiving data from the removable memory device, based on the transmission/reception clock; and
   a transmission section that transmits the generated phase synchronization pattern to the host terminal,
   wherein the phase synchronization pattern includes a first level signal which is at least two cycles long followed by a second level signal which is one cycle long.

2. A removable memory device according to claim 1, wherein the phase synchronization pattern includes another first level signal which is at least one cycle long after the second level signal which is one cycle long.

3. A removable memory device according to claim 1, further comprising:
   a start command reception section that receives a start command, which is for the host terminal to receive read data from the removable memory device, from the host terminal; and
   a packet generation section that sequentially packetizes responses to the start command and/or the read data and attaches the phase synchronization pattern to at least a first packet in response to the start command,
   wherein the transmission section transmits packets including the packet to which the phase synchronization pattern is attached.

4. A removable memory device according to claim 3, wherein the packet generation section attaches the phase synchronization pattern to all the packets generated in response to the start command.

5. A removable memory device according to claim 3, wherein the transmission section intermittently transmits packets to which the phase synchronization pattern is attached.

6. A removable memory device according to claim 3, wherein the phase synchronization pattern includes a head position or end position of the response and/or the read data included in the packet.

7. A removable memory device according to claim 3, wherein the transmission section transmits the response included in the packet to which the phase synchronization pattern is attached with a divided-by-n frequency clock which is obtained by dividing the transmission/reception clock by n (n>1).

8. A removable memory device according to claim 1, wherein the removable memory device is a secure digital (SD) memory card.

9. A phase synchronizing method implemented by a removable memory device that transmits/receives data to and from a host terminal, comprising:
   a clock reception step of receiving a transmission/reception clock, which has a cycle and which is used for transmitting/receiving data between the host terminal and the removable memory device, from the host terminal;
   a generation step of generating a phase synchronization pattern, which is for adjusting a phase of an internal reception clock which the host terminal incorporates for receiving data from the removable memory device, based on the transmission/reception clock; and
   a transmission step of transmitting the generated phase synchronization pattern to the host terminal,
   wherein the phase synchronization pattern includes a first level signal which is at least two cycles long followed by a second level signal which is one cycle long.

10. A removable memory device having stored thereon a program for transmitting/receiving data to and from a host terminal and which makes the removable memory device function as:
   a clock reception section that receives a transmission/reception clock, which has a cycle and which is used for transmitting/receiving data between the host terminal and the removable memory device, from the host terminal;
   a generation section that generates a phase synchronization pattern, which is for adjusting a phase of an internal reception clock which the host terminal incorporates for receiving data from the removable memory device, based on the transmission/reception clock; and a transmission section that transmits the generated phase synchronization pattern to the host terminal, in which:

the phase synchronization pattern includes a first level signal which is at least two cycles long followed by a second level signal which is one cycle long.

11. A computer readable recording medium on which a phase synchronizing program implemented by a removable memory device that transmits/receives data to and from a host terminal is recorded, the computer readable recording medium records the phase synchronizing program which implements:

a clock reception step of receiving a transmission/reception clock, which has a cycle and which is used for transmitting/receiving data between the host terminal and the removable memory device, from the host terminal;

a generation step of generating a phase synchronization pattern, which is for adjusting a phase of an internal reception clock which the host terminal incorporates for receiving data from the removable memory device, based on the transmission/reception clock; and a transmission step of transmitting the generated phase synchronization pattern to the host terminal, in which:

the phase synchronization pattern includes a first level signal which is at least two cycles long followed by a second level signal which is one cycle long.

12. A host terminal that transmits/receives data to and from a removable memory device, comprising:

a clock transmission section that transmits a transmission/reception clock, which is used for transmitting/receiving data between the host terminal and the removable memory device, to the removable memory device;

a phase synchronization pattern reception section that receives a phase synchronization pattern, which is generated based on the transmission/reception clock and which is for adjusting a phase of an internal reception clock which the host terminal incorporates for receiving data from the removable memory device, from the removable memory device; and a phase shift detection section that detects a phase shift between the internal reception clock and the data transmitted based on the transmission/reception clock from the removable memory device based on the phase synchronization pattern, in which:

the phase synchronization pattern includes a first level signal which is at least two cycles long followed by a second level signal which is one cycle long;

the phase synchronization pattern reception section receives a plurality of phase synchronization patterns; and the phase shift detection section detects a phase shift by averaging a plurality of phase shifts detected based on the plurality of phase synchronization patterns.

* * * * *